United States Patent Office 2,887,159
Patented May 19, 1959

2,887,159
METHOD OF SHUTTING OFF WATER IN PETROLEUM WELLS

William B. Harley, James A. Harmon, and Jack Sutherlin, Wichita Falls, Tex., assignors to The Dow Chemical Company, Midland, Mich., a corporation of Delaware No Drawing. Application November 16, 1955
Serial No. 547,292

3 Claims. (Cl. 166—29)

The invention relates to the treatment of petroleum wells. It more particularly concerns an improved method of increasing the ratio of the rate of oil production to that of water in oil wells which also yield water.

Water intrusion of oil wells results in additional expense in operation, such as corrosion of equipment, formation of emulsions, and added pumping cost. In many cases, a serious problem arises in the matter of disposing of the water produced. Water may enter oil wells from the earth formation either overlying or underlying the oil producing formation or from an earth layer between two oil-bearing zones. Oftentimes the source of the water is so closely related to that of the oil that it is not readily determinable whether the oil and the water come from the same or a separate portion of the earth penetrated by the well. Water from a water-bearing stratum overlying the oil-bearing stratum usually may be excluded from the well by a suitable casing, especially if the casing can be sealed in an impervious formation just above the oil-bearing formation. Water from a stratum underlying the oil yielding formation, usually referred to as bottom water, sometimes may be shut off with lead wool or a plug of cement lodged in the well hole filling it to a depth above the water stratum. In many instances, these attempts to shut off bottom water are not successful in that they do not improve the ratio of the rate of oil production to that of water and the water is either of necessity brought to the surface along with the oil, thereby incurring additional expense, or it may retard the entry of the oil to the well making it nonprofitable. In view of the difficulties and uncertainties involved in coping with water intrusion in oil wells, many attempts have been made to provide methods for accomplishing the desired control.

One of the methods heretofore proposed to control water intrusion in oil wells involves the use of a slurry of hydraulic cement in a vehicle consisting of kerosene or diesel oil. In this method, the slurry is injected into the well through the usual casing or tubing, care being taken to just displace the slurry from the well hole without permitting the displacing fluid to enter the adjacent earth formation. This practice of controlling the displacement of the cement slurry from the well bore has been based upon the concept that by such limitation of displacement the most effective control of the water intrusion would be had. In such a method, the hydraulic cement in the slurry becomes hydrated by the water it contacts and in time sets. But its supposed effectiveness in controlling water intrusion, in our experience, has been based upon too few observations. For, on examining the results of a relatively large number of instances of the application of the method, we find that while a reduction of water production may be obtained the production of oil on the average is also substantially reduced. One cause of these undesirable results is that the cement particles may prematurely separate from the vehicle as by filtration by the earth formation, thereby blocking the formation against the injection of a desirable amount of cement slurry. When filtration of the slurry occurs and blocking results, the uninjected portion of the slurry must be removed from the well and this operation involves additional time and labor. But the disadvantage of reducing the oil production while reducing water production oftentimes outweighs the benefit of reducing the water production. It is a desideratum in the art to provide a method of improving the rate of oil production compared to water production in wells yielding both oil and water.

We have now discovered that in accordance with our invention the adverse effect on oil production, while attempting to reduce water production and the difficulties attendant upon the injection of an oil-cement slurry into the producing formation of an oil well, can be overcome by certain departures from conventional practice. We have found that by compounding a cement slurry of hydraulic cement in a low fluid loss oily vehicle, injecting the slurry into the producing formations of the well, and immediately following the injection of the slurry with a flush of a liquid petroleum oil, such as crude oil, diesel oil, and kerosene, for example, as a displacing liquid, the aforesaid difficulties are overcome and desired objectives attained. The low fluid loss oil vehicle of the cement-oil slurry prevents premature separation of the cement from the vehicle during injection. As a result, we may inject a much larger amount of the slurry without the blocking action oftentimes encountered in the conventional practice with the high fluid loss vehicle, such as kerosene and diesel oil. By following the injection of the cement-low fluid loss-oil slurry immediately with a chaser of displacing liquid, the slurry is injected well out into the adjacent earth formation whether oil or water bearing, the displacement being rendered positive by the use of the low fluid loss vehicle for the cement slurry. On observing the results of carrying out the method of the invention on many oil wells yielding water, we have found that the method has the advantage of not only decreasing the production of water but also increasing the production of oil thereby favorably increasing the oil-water production ratio. We have also observed on applying the method to some potential oil wells yielding only water that they became oil producers with a decreased yield of water. The invention then consists of the improved method of treating wells drilled into oil-bearing formations yielding unwanted water to improve the oil-water production ratio herein fully described and particularly pointed out in the claims.

Before carrying out the invention, it is desirable to remove all the water or brine, if any, from the well hole and replace with oil so as to have the well dry and more or less filled with oil before treatment. Generally water or brine standing in the well hole may be circulated out with oil injected through a string of tubing lowered close to the bottom of the well. Long open sections which are difficult to empty of water by reverse circulation may be cleared of water by flushing with oil back into the earth formation. In carrying out the invention after removing the water or brine, if any, in the well hole and leaving it more or less filled with oil, the injection is made into the producing formation of a slurry of a hydraulic cement dispersed in a low fluid loss liquid oil vehicle compatible with petroleum oil.

Various hydraulic cements may be used. For example there may be used: (1) High-early-strength Portland cement. These Portland cements are characterized by having a higher than normal content of tricalcium silicate (60 to 70 percent) and are especially finely ground so that the specific surface of the particles of the cement is as much as 2400 to 2800 square centimeters per gram of the cement. Such cements have a rapid thickening time, usually less than an hour, on mixing with water. (2) Construction Portland cements. These are regular or standard Portland cements and have thickening times on mixing with water of 80 minutes to 150 minutes. Such cements usually contain a high percentage of tricalcium aluminate. The particles are of medium size for a cement, ranging in specific surface from 1500 to 1900 square centimeters per gram. Accelerators may be used advantageously in such cements to increase the rate of thickening and hardening. (3) Oil well cements. These are Portland cements having thickening times of about 100 to 140 minutes. They contain less than the normal percentage of tricalcium aluminate and a higher than normal percentage of tricalcium alumino-ferrite. These cements are usually sulfate resistant. The particles of these cements have a specific surface ranging from 1100 to 1900 square centimeters per gram. (4) High-temperature or retarded Portland cement. High temperature and pressure tend greatly to shorten the thickening time of most Portland cements and to offset this property the retarded cement is more coarsely ground than usual so as to provide, for example, a specific surface of 1400 to 1600 square centimeters per gram. Its tricalcium aluminate content is relatively low and a retarder, such as sodium tannate, may be admixed with the cement. Such cements may require from 140 to 240 minutes to thicken on becoming hydrolyzed with water. (5) Gel cements. These are Portland cements to which finely ground bentonite has been added. The bentonite decreases the setting time slightly. (6) Fiber cements. These are Portland cements to which has been added fibrous materials, such as cottonseed hulls, shredded paper or cellophane, mica flakes, asbestos fiber or sugar cane fiber, or the like. (7) Acid-soluble cements. These are Portland cements to which has been added a very finely ground easily acid-soluble material, such as calcium carbonate (limestone). Such cements when set are more or less readily soluble in an acid, such as hydrochloric. The thickening rate of such cements is not materially different from that of the Portland cement of which the acid-soluble cement mixture is made. Such cement mixtures may also contain up to about 3 percent of bentonite without interfering with their acid solubility. (8) Gypsum cement. This material is finely ground at least partially dehydrated calcium sulfate. On mixing with water in amount to form the hydrate, $CaSO_4 \cdot 2H_2O$, setting occurs. This cement sets and hardens to full strength in about 2 hours after the addition of water. (9) High alumina Portland cement. These are manufactured by sintering or melting a mixture of limestone and bauxite. When cool, the resulting clinker is finely ground. The setting time for this type of cement is about the same as that of ordinary Portland cement but develops strength much more rapidly after setting. Such cements are as strong as 24 hours after dehydration as ordinary Portland cement after 28 days. (10) Iron oxide cement. These Portland cements are prepared in the same way as ordinary Portland cement but hematite (iron ore) is substituted for the clay or shale usually used. This cement is especially resistant to the destructive effect of saline waters. (11) Sand-cement mixtures. These are mixtures of any of the foregoing cements and sand and have a somewhat shorter setting time than that of the cement along due to the water absorption effect of the sand present in the mixture. In these mixtures the sand may comprise from 5 or 10 to 30 percent by weight of the cement sand mixture. These cement-sand mixtures are especially advantageous in the instant method as will later be explained.

In preparing the cement slurry for use in the invention, any of the foregoing hydraulic cements are dispersed in a hydrocarbon oil vehicle having a fluid loss or not greater than 600 milliliters in 2 minutes at 80° F. as measured by the apparatus and procedure described in A.P.I. Code No. 29, second edition, July 1942 (tentative). The fluid loss of the oil vehicle need not be smaller than 70 milliliters in 30 minutes at 80° F. Such oil vehicles may have viscosities of 20 to 300 centipoises at 80° F. A preferred range of fluid loss for the oil vehicle is between 15 to 600 milliliters in 5 minutes at 80° F. or a viscosity of about 25 to 250 centipoises at 80° F. Any of the liquid hydrocarbon oils may be used having the required fluid loss characteristics or to which the required fluid loss characteristics can be imparted by mixing with the oil a material capable of producing the desired fluid loss characteristic. Examples of oils, the fluid loss of which can be controlled by suitable additions of appropriate thickening materials are kerosene, diesel oil, crude or refined petroleum oil. Some of the refined petroleum oils have the required fluid loss characteristic without further treatment. An example of a material suitable for reducing the fluid loss of high fluid loss oils to the desired range is powdered asphalt of about 100 mesh particles size. Other materials are certain alkyl aryl sulfonates. A suitable one of these is known in the trade as "Adomite."

The following are examples of suitable oil vehicles treated to reduce the fluid loss to within the desired range.

EXAMPLE 1

Kerosene oil of 42 A.P.I. gravity in which has been dispersed 100 pounds of 100 mesh asphalt per 1000 gallons of the oil. The oil-asphalt dispersion has a fluid loss at 80° F. of about 50 milliliters in 5 minutes.

EXAMPLE 2

Diesel oil in which has been dispersed 100 pounds of 100 mesh asphalt per 1000 gallons of the oil. The dispersion has a fluid loss of 55 milliliters in 6 minutes.

EXAMPLE 3

A refined petroleum oil having a fluid loss of 300 milliliters in 55 seconds has its fluid loss reduced to a usable value of 18 milliliters in 5 minutes by dispersing in it 100 pounds of asphalt.

EXAMPLE 4

Kerosene oil in which is dispersed an alkyl aryl sulfonate, referred to in the trade as Adomite, at the rate of 100 pounds per 1000 gallons of the kerosene oil, has a fluid loss of 4 milliliters in 30 minutes.

EXAMPLE 5

Diesel oil or kerosene, having a fluid loss of 600 milliliters in 18 seconds, is mixed with an equal volume of a refined petroleum oil having a fluid loss of 108 milliliters in 30 minutes. The resulting mixture has a fluid loss of 600 milliliters in 15 minutes at 80° F.

These low fluid oils are compatible with those in petroleum-bearing earth and may be injected thereinto without detriment. The relative amounts of cement and oily vehicle which may be used are not sharply critical, the proportions used being those giving a pumpable slurry. For example, there may be used from about 300 to 2400 pounds of hydraulic cement per 100 gallons of oily vehicle. A preferred proportion is about 1600 pounds of cement per 100 gallons of vehicle.

The volume of slurry to use may vary over a wide range as for example from 200 to 1000 gallons for each 10 feet of vertical thickness of earth formation to be treated, but other amounts may be used. For larger or smaller thicknesses of earth formation proportionally larger or smaller amounts respectively may be used. The injection of the cement slurry is made in a manner similar to that used in conventional squeeze cementing. For example, a string of tubing carrying a packer at the lower end may be run into the well to the section of formation to be treated and the packer set at or above the top of the section.

The injection of cement slurry is made preferably through the tubing string, leaving the packer unseated at first so that oil in the tubing ahead of the slurry may pass from the tubing into the well hole and displace oil from the annular space between the tubing string of the well hole until the cement slurry is about to emerge from the bottom of the tubing and enter the well hole. Before the cement slurry is about to emerge from the bottom of the tubing, the tubing preferably is raised so that the lower end is at about the elevation of the top of the zone or section to be treated. The packer is then seated and the injection of cement slurry continued. In deep wells, because of the relatively large volume of the bore of the tubing string, or casing if the charge of slurry is injected through the casing, the entire charge of slurry may be introduced into the tubing or casing before any reaches the bottom. In any case, the introduction of the cement slurry is immediately followed by displacement oil in one continuous injection so as to keep the slurry on the move until it is displaced from the tubing or casing and properly placed in the earth formation. The oil injection following the injection of slurry is termed herein for convenience overflush. The volume of oil used in the overflush is at least ⅓ to 10 or more times that of the slurry. Following the overflush the well is shut in for a time to allow the cement to hydrate where it encounters water or brine. The shut-in time does not appear to be sharply critical but depends upon the rate of hydration or nature of the cement used, the temperature of the earth and other factors. In general the well may be shut-in for 1 hour with fast setting cements in warm wells or longer with slow cements and low well temperatures. Shut-in times up to a day or two or longer may be employed.

In the presence of a relatively high concentration of water or brine, such as exists in water- or brine-bearing earth as compared to that bearing oil, the cement in the slurry hydrates, gels and sets to form a barrier preventing or reducing the passage of aqueous fluid into the well hole. On producing the well following a treatment, the cement which has not become hydrated usually will be displaced by oil flowing from the formation into the well. In some instances, little or none of the unhydrated cement may be returned as the well is produced. We have found that removal of unhydrated cement from the formation can be facilitated if in preparing the slurry of cement in the low fluid loss oil vehicle there be included in the slurry some sand, as by the use of the mixtures of cement and sand already mentioned. When sand or similar particulated hard solid is included in the cement-slurry and the slurry is injected into the oil-bearing formation, as may occur during the treatment of a well by the method, the sands acts as a propping agent holding open the interstices, cracks, or fractures into which the slurry is injected, thereby allowing the easy return to the well of the unhydrated cement, if any, when production is resumed. In that way, the presence of sand in the cement slurry is an advantage over the use of the plain cement-low fluid loss oil slurry.

For purposes of comparing the results of the practice of the instant method against the results of other methods, the following data are tabulated below. These data are based upon the field observations of treatments performed on various wells in various oil fields in the United States of America.

Table

| Number of Wells Treated | Type of Method | Oil Production Per Day | | | Water Production Per Day | | | Oil/Water Ratio | |
|---|---|---|---|---|---|---|---|---|---|
| | | Total Barrels | | As per-cent of Initial | Total Barrels | | As per-cent of Initial | | |
| | | Before Treatment | After Treatment | | Before Treatment | After Treatment | | Before Treatment | After Treatment |
| 20 | DLU [1] | 909 | 555 | 61.1 | 3,110 | 499 | 16.1 | 29.2 | 111.1 |
| 23 | DPT [1] | 1,082 | 469 | 43.3 | 2,823 | 437 | 15.5 | 38.3 | 107.1 |
| 11 | LFLPT [2] | 166 | 468 | 282 | 1,176 | 321 | 27.3 | 14.1 | 146.0 |

[1] High fluid loss vehicle; 3 to 12 gallons of vehicle per sack of cement.
[2] Low fluid loss oil vehicle used had fluid loss of 600 ml. in 15 min. at 80° F.; 3 to 12 gallons of vehicle used per sack of cement.

In the table, three types of well treating methods are compared. Those designated DLU (referred to in the field as diesel oil lockup treatments) involve wells treated by the injection into the formations yielding oil and water of a slurry of Portland cement in diesel oil (high fluid loss oil), the injection being terminated without a displacing liquid and the well left shut-in for some time before resuming production. Those designated DPT (referred to in the field as diesel oil pump through treatments) involve wells treated similarly to those designated DLU but with the exception that an additional step is performed consisting of the injection of a displacing liquid into the earth formations immediately following the injection of the diesel oil-cement slurry in one continuous pumping operation. Those designated LFLPT (referred to in the field as low fluid loss pump through treatments) are treatments performed in accordance with the instant method. In the LFLPT treatments of the table, there was injected into the producing formation of the wells involved a slurry of Portland cement in a low fluid loss oil as specified herein followed by a displacing liquid of petroleum oil, usually crude oil. The data shown include the number of barrels of daily production of all the wells added together in each group before and after the designated treatment. Twenty wells were subjected to DLU treatments; twenty-three were subjected to the DPT treatments; and eleven to LFLPT treatments. From the daily so-totalized production figures the effect on the oil production of the treatments was obtained by dividing the total daily oil and water production figures of the wells involved, after treatment, by the corresponding daily total production figures before treatment and expressing the result in terms of percent of the initial or before treatment production (e.g. in the case of the DLU treatments, as in the others, the calculation is:

$$\frac{100 \times 555}{909} = 61.1\%)$$

The last two columns of the table show the oil/water ratios, in percent of the rate of total oil and water production figures, before and after treatment (e.g. in the case of the DLU treatments the calculations are as follows:

$$100 \times \frac{909}{3110} = 29.2\%$$

and $$\frac{100 \times 499}{555} = 111.1\%)$$

By referring to the data in the table, it is manifest that the rate of oil production on the average is greatly increased by the method of this instant invention as shown by the fact that the total production of 11 wells showed an increase in production rate of 282 percent. This increase in production rate is to be compared with the decreased rate of total oil production which results on applying the DLU or DPT types of treatments where the total oil production after treatment was reduced to 61.1 percent and to 43.3 percent of the total initial rate, respectively. At the same time, it will be observed that the total water production is reduced to 27.3 percent of the original total production rate. This compares favorably with the total water production rates after the DLU and DPT treatments of 16.1 percent and 15.5 percent, respectively. It is significant to note that the relative rate of total oil production compared to the rate of total water production after the LFLPT treatments is 146 percent as compared to 111.1 percent and 107.1 percent after the DLU and DPT types of treatments, respectively. In other words by the LFTPT type of treatment, the proportion of oil produced relative to water is greatly increased and this increase is greater than the results from either the DLU or the DPT type of treatments.

This application is a continuation-in-part of our co-pending application Serial No. 509,104, filed May 17, 1955, now abandoned.

We claim:

1. The method of treating an oil well penetrating a petroleum-bearing formation which admits water or brine to the well, the well having the usual casing therein, so as to improve the ratio of the rate of oil production to that of water or brine which comprises making an injection into the producing formations of the well of a pumpable slurry of a hydraulic cement in a low fluid loss vehicle comprising petroleum oil, said vehicle being free from water and having a fluid loss of not greater than 600 milliliters in 2 minutes at 80° F. and chasing the injection of the slurry with an injection of petroleum oil devoid of cement in a volume at least one-half that of the slurry, and shutting in the well so as to allow the cement to hydrate in the presence of the water or brine encountered by the cement in the earth formations.

2. The method according to claim 1 in which the hydraulic cement is Portland and the vehicle is a petroleum oil.

3. The method according to claim 2 in which there is included with the Portland cement in admixture therewith from 5 to 30 percent by weight of sand.

References Cited in the file of this patent

UNITED STATES PATENTS

| | | |
|---|---|---|
| 1,107,979 | Mitchell | Aug. 18, 1914 |
| 1,772,999 | Huber | Aug. 12, 1930 |
| 2,065,512 | Cannon | Dec. 29, 1936 |
| 2,146,480 | Kennedy | Feb. 7, 1939 |
| 2,285,302 | Patterson | June 2, 1942 |
| 2,379,516 | Garrison | July 3, 1945 |
| 2,800,963 | Roberts et al. | July 30, 1957 |